United States Patent
Huang

(10) Patent No.: US 10,082,242 B1
(45) Date of Patent: Sep. 25, 2018

(54) MULTIDIRECTIONAL FAST TUBE-ATTACHABLE FRAME

(71) Applicant: Pei-Hsiu Huang, New Taipei (TW)

(72) Inventor: Pei-Hsiu Huang, New Taipei (TW)

(*) Notice: Subject to any disclaimer, the term of this patent is extended or adjusted under 35 U.S.C. 154(b) by 0 days.

(21) Appl. No.: 15/586,263

(22) Filed: May 3, 2017

(51) Int. Cl.
*F16M 13/02* (2006.01)
*F16B 2/10* (2006.01)
*B62J 9/00* (2006.01)

(52) U.S. Cl.
CPC ............ *F16M 13/022* (2013.01); *F16B 2/10* (2013.01); *B62J 9/003* (2013.01); *B62J 2300/0006* (2013.01)

(58) Field of Classification Search
CPC . B62J 9/003; B62J 2300/0006; F16M 13/022; F16B 2/10
USPC .... 248/229.13, 229.23, 228.4, 230.4, 231.51
See application file for complete search history.

(56) References Cited

U.S. PATENT DOCUMENTS

| | | | | |
|---|---|---|---|---|
| 6,047,937 A * | 4/2000 | Huang | ................ | B60N 3/102 248/311.2 |
| 6,095,471 A * | 8/2000 | Huang | ................ | B60N 3/102 224/400 |
| 6,527,240 B1 * | 3/2003 | Huang | ................ | A47G 23/0225 248/218.4 |
| 2002/0070324 A1 * | 6/2002 | Huang | ................ | A47G 23/0225 248/311.2 |
| 2011/0062199 A1 * | 3/2011 | Liu | ................ | B62J 7/06 224/420 |
| 2016/0129961 A1 * | 5/2016 | Hed | ................ | B62J 11/00 224/414 |
| 2017/0284433 A1 * | 10/2017 | Thomas | ................ | F16C 11/06 |
| 2017/0288292 A1 * | 10/2017 | Renilson | ................ | H01Q 1/1228 |
| 2017/0303654 A1 * | 10/2017 | Whitten | ................ | A45C 11/00 |
| 2018/0001950 A1 * | 1/2018 | Allen | ................ | B62J 9/003 |

* cited by examiner

*Primary Examiner* — Eret C McNichols
(74) *Attorney, Agent, or Firm* — Leong C. Lei

(57) ABSTRACT

Disclosed is a multidirectional fast tube-attachable frame, which generally includes, in structure, a clamp body that includes a first clamping member, a second clamping member, and a tightness adjustment assembly; a connection section respectively defined on the first clamping member and the second clamping member; two clamping sections respectively formed on and extending along opposite sides of the connection section; at least one tenon section respectively formed on the clamping sections; a clamping cutout section respectively formed on each of the clamping sections; a turning assembly and a rotation assembly movably arranged at an end of the clamp body; and a position-constraining mechanism. As such, by means of clamping members that are integrally formed and mutual jointing of the tenon sections, the structural strength and clamping force of the clamp body are improved. The turning assembly and the rotation assembly allow for free adjustment of angular position.

7 Claims, 13 Drawing Sheets

MULTIDIRECTIONAL FAST TUBE-ATTACHABLE FRAME

(a) TECHNICAL FIELD OF THE INVENTION

The present invention relates generally to a multidirectional fast tube-attachable frame, and more particularly to a multidirectional fast tube-attachable frame that comprises a clamp having a high structural strength and providing a strong clamping force and allows for free angular adjustment and fast positioning after receiving a member-to-be-held coupled thereto.

(b) DESCRIPTION OF THE PRIOR ART

Articles or structures that involves tubes or bars for supporting or connecting are commonly used in daily lives. For example, for wheelchairs, bicycles, or beach chairs, it would be inconvenient if it is desired to securely hold or support cups or mobile phones thereon. To cope with such inconvenience, a tube clamp is provided for attaching to a tubular or rod-like member and an object-to-be-held is mounted to and supported by the tube clamp, this improving convenience of operation and use.

Most of the tube clamps that are currently available make use of a spring force of an elastic element to attach the tube clamp and the object-to-be-held to a tubular or rod-like member. An obvious drawback of such a known measure of clamping is that the clamping force or clamping power is often weak or insufficient. Although rubber-based members may be used to increase a frictional force for clamping, there is often still an upper limit for the weight of the object that the known tube clamp may support. Some other tube clamps that do not rely on an elastic element to achieve clamping involve a fastening operation for tightly and securely fixing. Such a known measure of fixing, although providing a better solution of fixing that is more powerful in clamping, requires a tool to carry out the fastening operation. In addition, structural strength is another concern about the tube clamp of this type.

The tube clamp that is fixed through a fastening operation necessarily compresses the tubular or rod-like member to which the tube clamp is attached by being compressed or pressurized by a fastener and is thus necessarily receiving a reactive force applied from the tubular or rod-like member to which the tube clamp is attached. This undesirably causes deformation or even breaking at a curved portion of the tube clamp and consequently, the tube clamp may get detached and falling, or even gets severely damaged and become inoperable. Increasing the size, such as thickness, of the clamp tube or making the clamp tube through an integral formation process may be applied to overcome such a structural strength issue; however, the nature of the clamp tube for being operable to attach to an external member makes the structure complicated and this makes such solutions difficult for manufacturing, not to even mention any concern about coupling with an object-to-be-held.

Thus, the technical issue that the present invention is made for is to overcome the above-discussed shortcomings.

SUMMARY OF THE INVENTION

In view of the above-discussed shortcomings, the present invention is made to overcome such shortcomings of the prior art by providing a multidirectional fast tube-attachable frame that comprises a clamp having a high structural strength and providing a strong clamping force and allows for free angular adjustment and fast positioning after receiving an member-to-be-held coupled thereto.

The primary objective of the present invention is that through steel pressing and bending and mutual jointing of tenons, clamping members having two ends showing opposite U-shapes are formed in order to improve structural strength and clamping force of a clamp body.

Another objective of the present invention is that through use in combination with a turning assembly and a rotation assembly for free adjustment of angular position and a position-constraining mechanism for easy selection and setting of angle, convenience of use of a member-to-be-held is enhanced.

To achieve the above objectives, the present invention provides a structure that comprises: a clamp body, which is in the form of an X-shape. The clamp body comprises a first clamping member and a second clamping member that are mutually inserted into each other and rotatably coupled to each other. The two clamping members are respectively formed with a connection section. Two opposite sides of the connection section are each formed with a clamping section extending therewith. The clamping sections are respectively formed with at least one tenon section for mutual jointing with each other to improve structural strength. Each of the clamping sections is formed with a clamping cutout section. A tightness adjustment assembly is movably arranged at one side of the first clamping member for adjusting tightness of the first clamping member and the second clamping member. A turning assembly and a rotation assembly are movably arranged on the second clamping member for coupling with a member-to-be-held. The rotation assembly is provided, on one side thereof, with a position-constraining mechanism, which selectively changes, through the rotation assembly, a direction of the member-to-be-held. When a user applies the present invention to clamp a tubular object, the two clamping sections are made to simultaneously clamp such that the clamping cutout section encloses the tubular object to thereby achieve excellent mounting of the clamp body to the tubular object. Jointing between the tenon sections helps improve structural strength in order to effectively support and resist a fastening operation of the tightness adjustment assembly. Further, through coupling of the turning assembly and the rotation assembly with the member-to-be-held, it is possible to achieve free adjustment of angle through rotation or turning and it is also possible to manipulate the angle of the member-to-be-held by simply using the position-constraining mechanism to have it fixed at a desired angular position, allowing for subsequent use and operation by a user.

With above-described techniques, the drawbacks of the prior art tube clamp that the clamping force is insufficient, the durability of the clamp is poor, a tool must be involved in fastening, and operation freedom of a member-to-be-held coupled thereto is poor can be overcome to thereby achieve the advantages discussed above.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
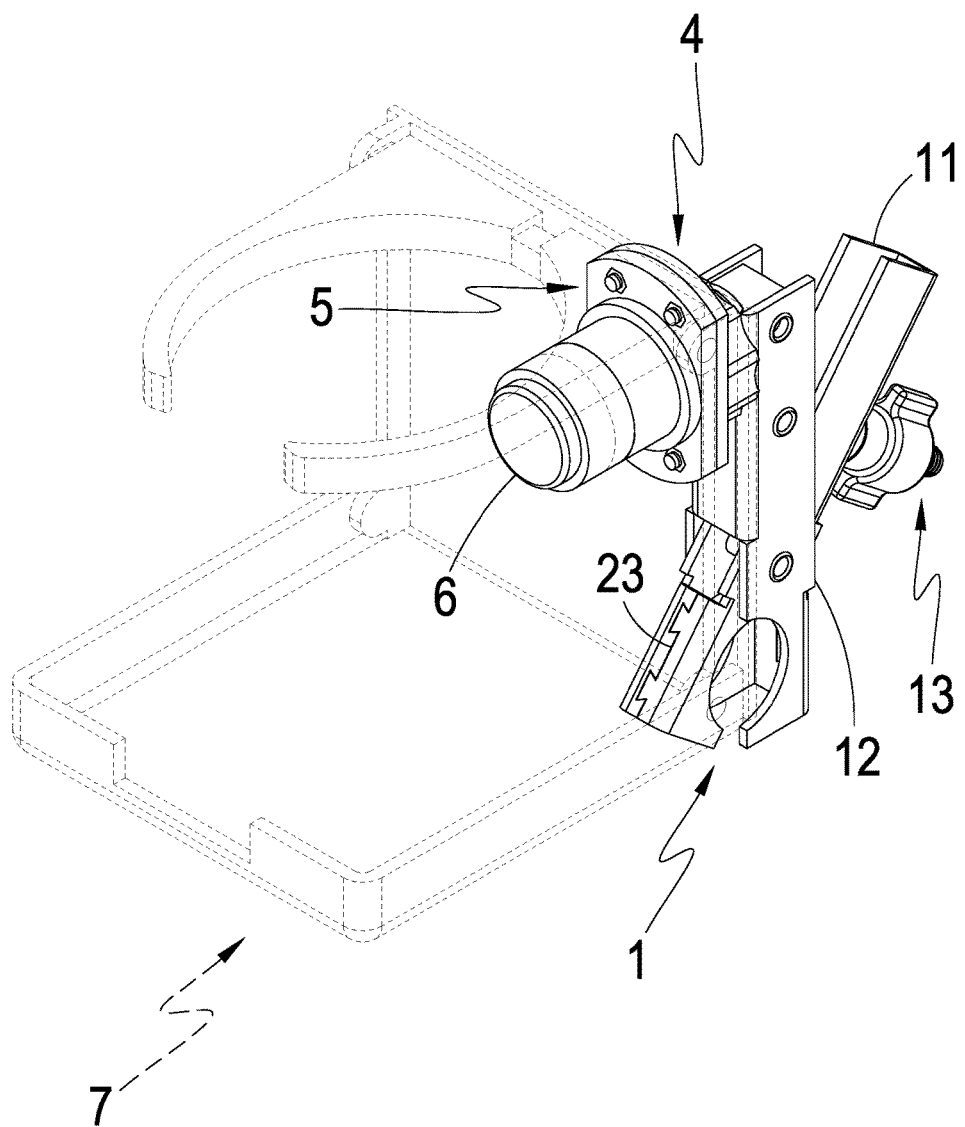
FIG. 1 is a perspective view showing a preferred embodiment of the present invention.
Figure 2:
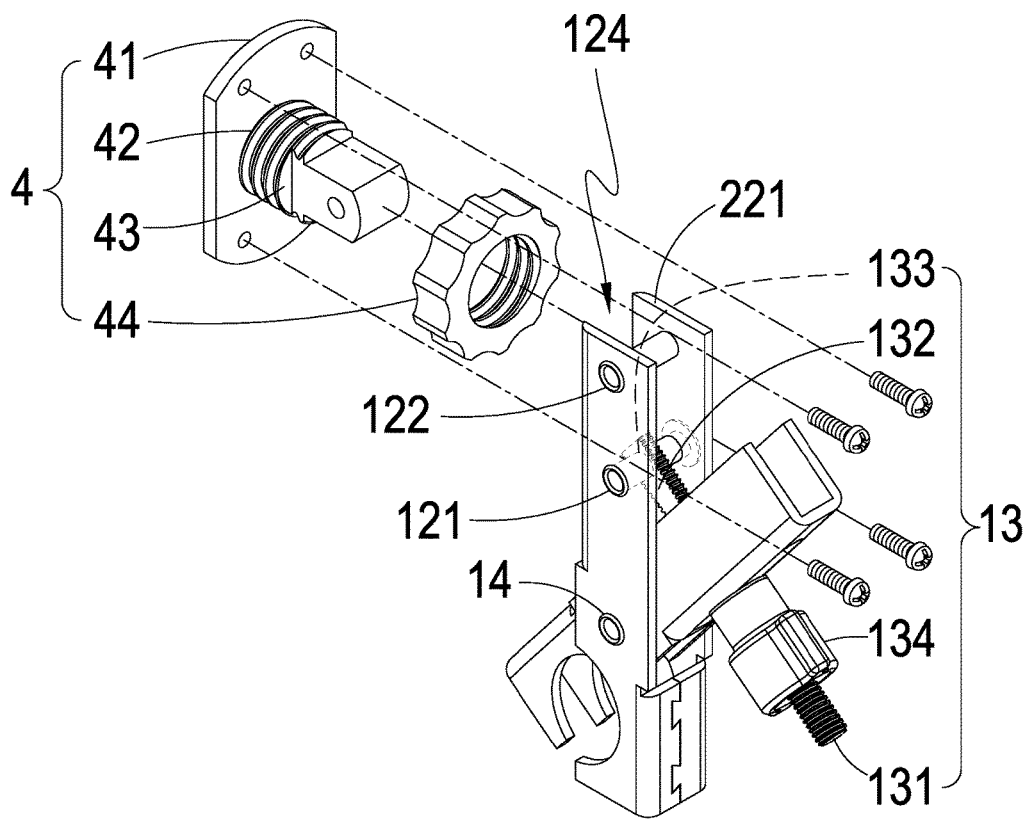
FIG. 2 is an exploded view showing a clamp body and a turning assembly according to the present invention.
Figure 3:
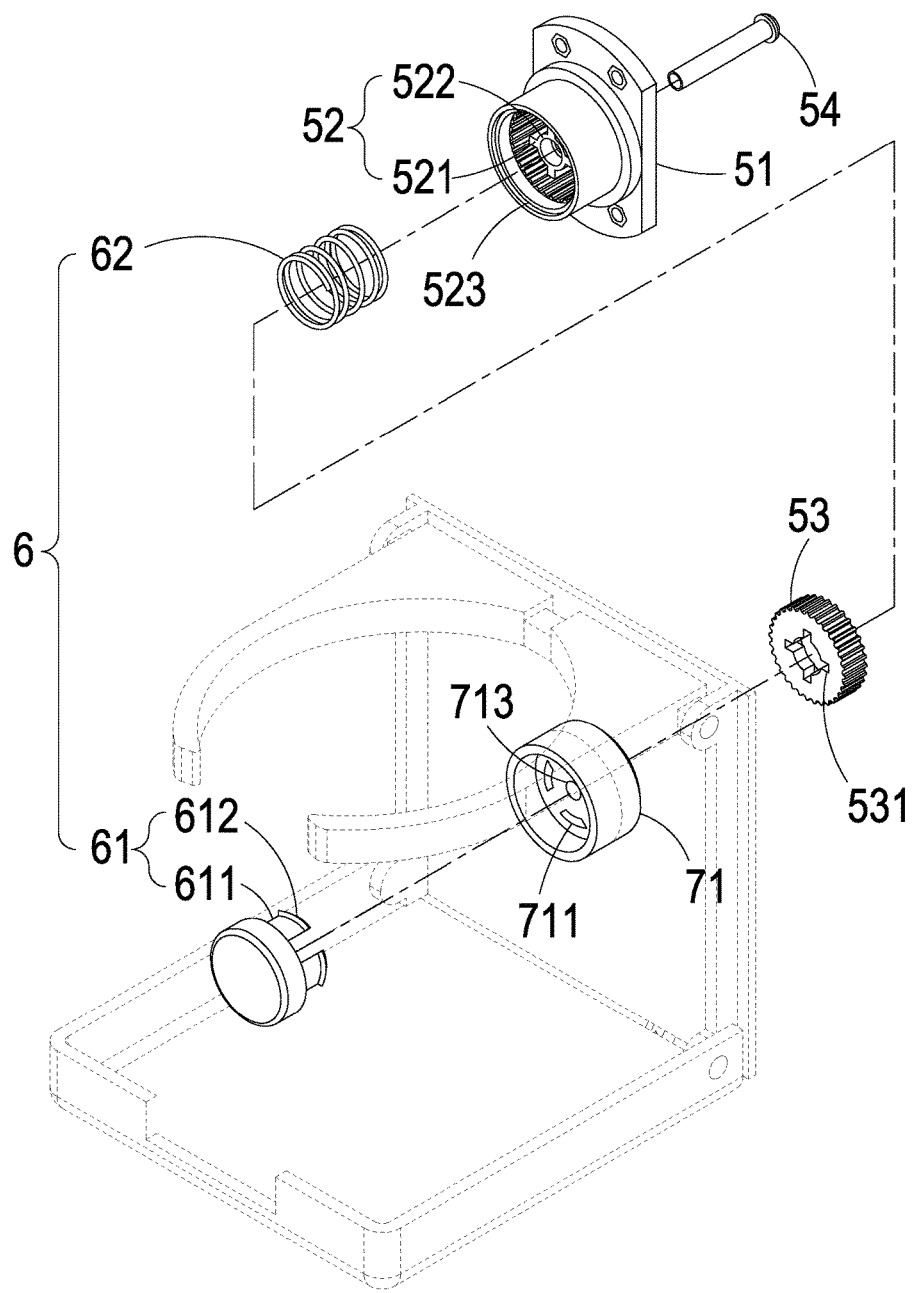
FIG. 3 is an exploded view showing a member-to-be-held and a rotation assembly according to the present invention.
Figure 4:
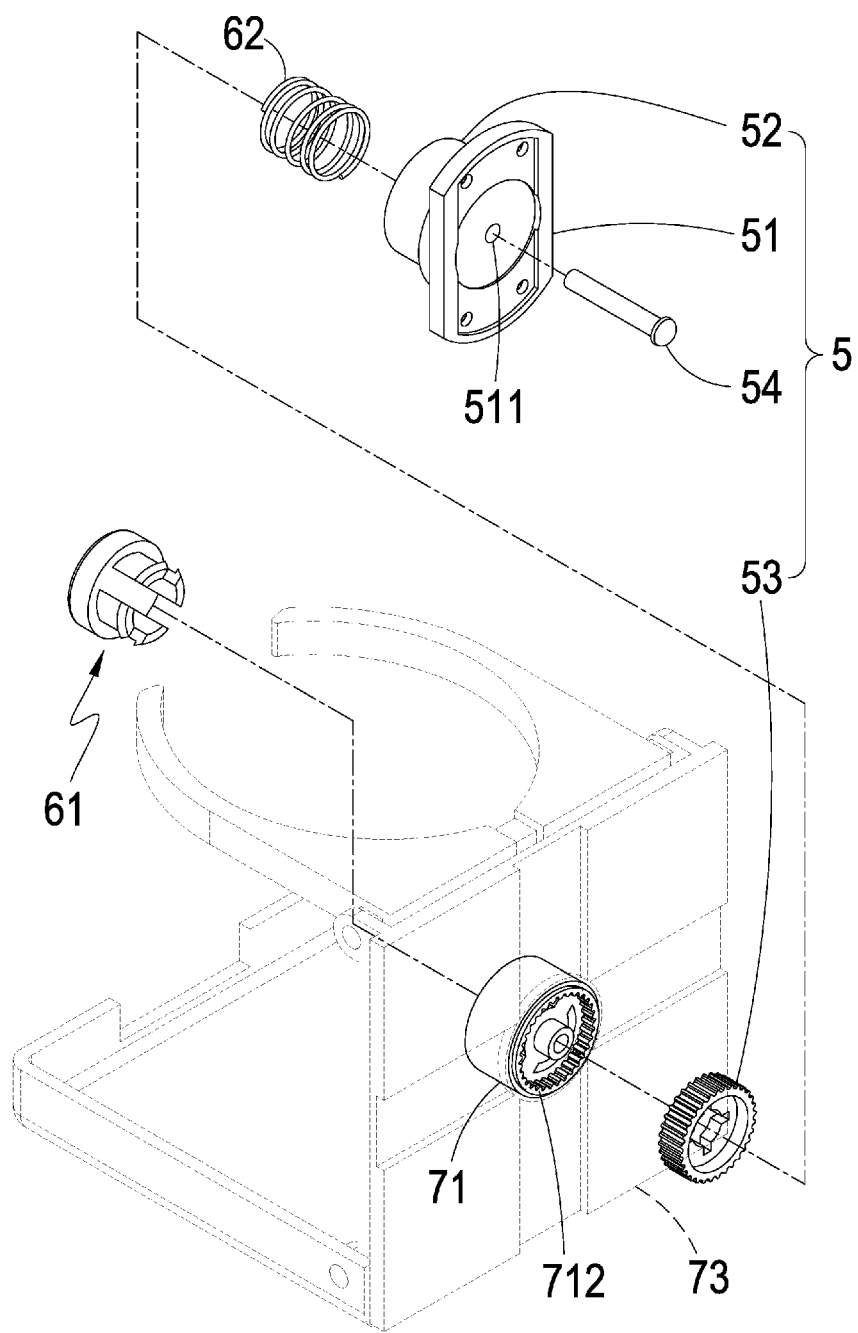
FIG. 4 is an exploded view, similar to FIG. 3, but taken from a different perspective.
Figure 5:
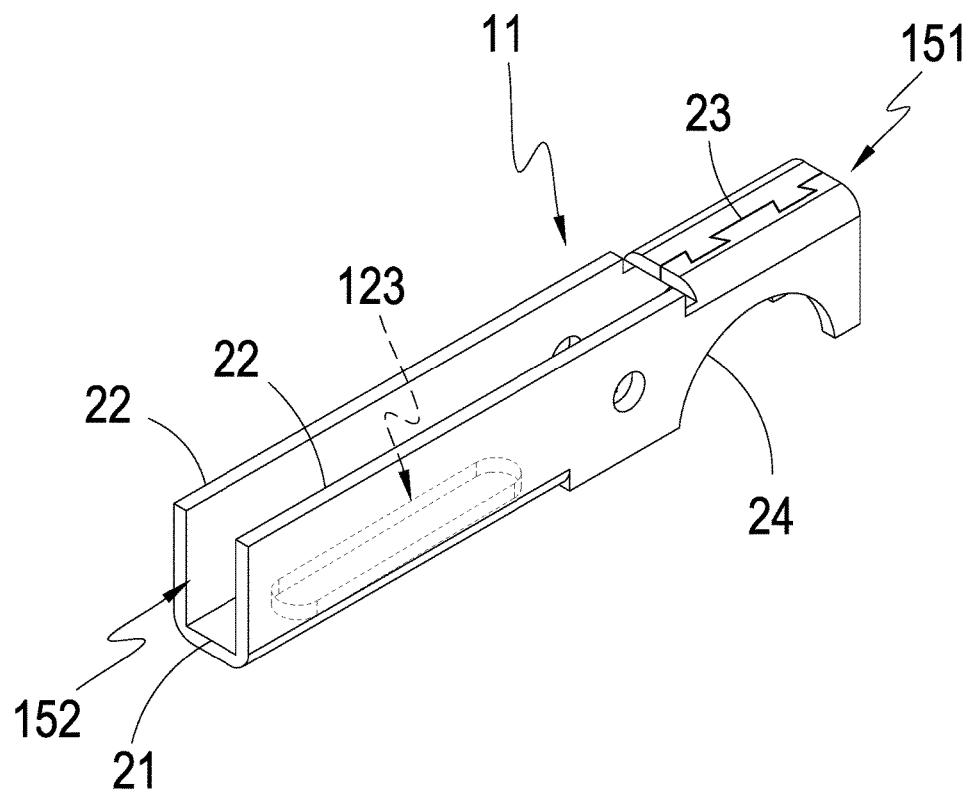
FIG. 5 is a perspective view showing a clamping member of the preferred embodiment of the present invention.
Figure 6:
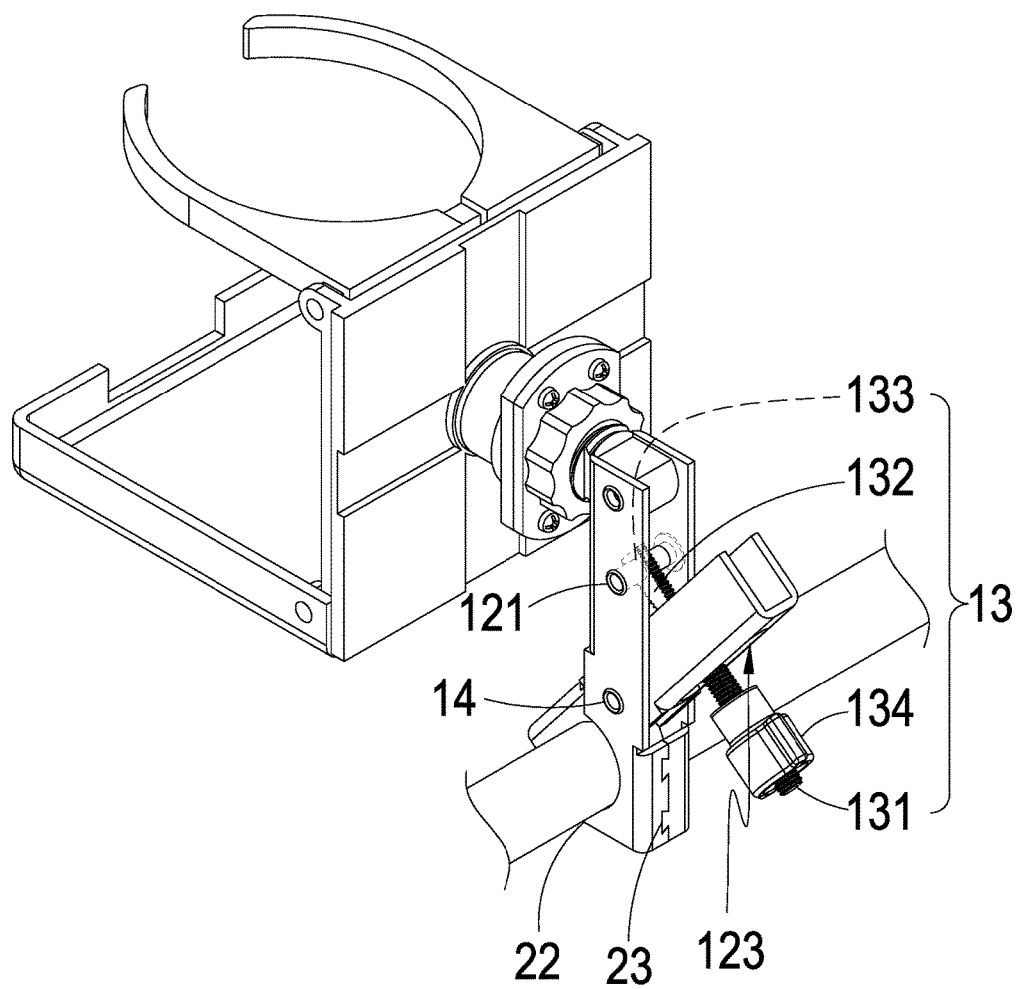
FIG. 6 is a schematic view illustrating a clamping operation of the preferred embodiment of the present invention.

Referring to FIGS. 1-5, which are respectively a perspective view showing a preferred embodiment of the present invention, an exploded view showing a clamp body and a turning assembly according to the present invention, an exploded view showing a member-to-be-held member and a rotation assembly according to the present invention, an exploded view, similar to FIG. 3, but taken from a different perspective, and a perspective view showing a clamping member of the preferred embodiment of the present invention, these drawings clearly show the present invention comprises:

a clamp body 1, which is in the form of an X-shape, wherein the clamp body 1 comprises a first clamping member 11 and a second clamping member 12 that are mutually inserted into each other and rotatably coupled to each other;

a connection section 21 that is respectively defined on the first clamping member 11 and the second clamping member 12;

an elongate through hole 123 that is formed on the connection section 21 of the first clamping member 11;

two clamping sections 22 that are respectively formed on and extending along opposite sides of the connection section 21;

a plurality of abutting surfaces 221 that are defined in side surfaces of the clamping sections 22;

at least one tenon section 23 that is respectively formed on the clamping sections 22 for jointing to each other to strengthen the structural strength, wherein an end of the first clamping member 11 and the second clamping member 12 that is adjacent to the tenon section 23 is formed as a first end section 151 in the form of an inverted U-shape and an end of the first clamping member 11 or the second clamping member 12 that is distant from the first end section 151 is formed as a second end section 152 in the form of a U-shape such that the first and second clamping members 11, 12 are set in a form where two ends are U-shapes that are opposite to each other and the first and second clamping members 11, 12 are mutually inserted into each other and rotatably coupled to each other to form an X-shape;

a clamping cutout section 24 that is respectively formed on an end of each of the clamping sections 22 that is distant from the tenon section 23, where the clamping cutout section has a contour that is one of a rectangle, a circle, and en ellipse;

a position-constraining axle 121 that is arranged between the second clamping member 12 and the clamping sections 22;

a pivotal axle section 14 that is arranged between the first clamping member 11 and the second clamping member 12, wherein the pivotal axle section 14 is located between the clamping cutout section 24 and the position-constraining axle 121 of the second clamping member 12 and corresponds, in position, to the first clamping member 11;

a turning axle 122 that is arranged at one side of the position-constraining axle 121 and is located between the clamping sections 22;

a turning opening section 124 that is formed on an end of the connection section 21 of the second clamping member 12 that is distant from the tenon section 23 to allow for turning of a turning assembly 4 that will be described hereinafter;

a tightness adjustment assembly 13 that is movably arranged at one side of the first clamping member 11 and is operable to adjust tightness of the first clamping member 11 and the second clamping member 12, wherein the tightness adjustment assembly 13 comprises a threaded fastening member 131 penetrating through the elongate through hole 123, a flattened section 132 formed on the threaded fastening member 131, a through aperture section 133 formed on the flattened section 132 to receive the position-constraining axle 121 to penetrate therethrough, and a tightening member 134 screwed on the threaded fastening member 131 for fastening the first clamping member 11;

a turning assembly 4 that is movably arranged on the second clamping member 12 to couple with a member-to-be-held 7, wherein the turning assembly 4 comprises a turning seat 41 rotatably mounted to the turning axle 122, a threaded fastening section 42 formed on the turning seat 41, a plurality of cut and removed sections 43 respectively formed on opposite sides of the turning seat 41 and located on the threaded fastening section 42, and a positioning member 44 fit to the turning seat 41 and screwed on the threaded fastening section 42, such that the positioning member 44 is selectively abutting one of the abutting surfaces 221;

a rotation assembly 5 arranged at one side of the turning assembly 4, wherein the rotation assembly 5 comprises a rotation seat 51 coupled to the turning assembly 4, a first pin hole section 511 at a center of the rotation seat 51, an engagement slot 52 formed on the rotation seat 51, at least one first joint lip 523 defined on an upper edge of the engagement slot 52, an engagement member 53 movably arranged in the engagement slot 52, and a riveting element 54 penetrating through a position-constraining post 521, which will be described hereinafter, and the engagement member 53 to rivet-joint the rotation seat 51 and an engagement seat 71, which will be described hereinafter;

an engagement seat 71 that is integrally formed on the member-to-be-held 7 and is operatively couple to and rotatable with the rotation seat 51 by means of the engagement member 53, wherein the member-to-be-held 7 is formed with a fixing wall 73 and the engagement seat 71 is formed on the fixing wall 73, and further, the engagement seat 71 is formed with at least one position-constraining hole 711, and the engagement seat 71 is provided, at a center thereof, with a second pin hole section 713 that corresponds, in position, to the first pin hole section 511, so as to allow the riveting element 54 to penetrate through the first pin hole section 511 and the second pin hole section 713;

at least one second joint lip 712, which is defined on a lower edge of the engagement seat 71 to couple with the first joint lip 523; and a position-constraining mechanism 6 that is arranged at one side of the engagement seat 71 to selectively change, through the rotation assembly 5, a direction of the member-to-be-held 7, wherein the position-constraining mechanism 6 comprises a push member 61 that is mounted to the member-to-be-held 7 in a manner of being operable to selectively project out thereof to selectively push and move the engagement member 53, and an elastic element 62 arranged in the engagement slot 52 to allow for reciprocal movement of the engagement member 53, wherein the push member 61 comprises at least one retaining section 611 penetrating through the position-constraining hole 711 and a barb section 612 formed on the retaining section 611 for engaging and abutting the engagement seat 71.

Further, the engagement slot 52 is formed, in the interior thereof, with a position-constraining post 521 over which the elastic element 62 is fit and the position-constraining post 521 is formed, on a side wall thereof, with at least one position-constraining projection 522. Further, the engagement member 53 is formed with a position-constraining recess 531 corresponding to and coupled to the position-constraining post 521 and the position-constraining projection 522.

The description given above provides an understanding to the structural arrangement of the present invention. Based on the collaborative combination of the above structural arrangement, the clamp is provided with a high structural strength and a powerful clamping force and achieves the advantages of free angular adjustment and fast positioning after receiving the member-to-be-held coupled thereto. Further details are provided below.

Referring collectively to FIGS. 1-10, which are respectively a perspective view showing a preferred embodiment of the present invention, an exploded view showing a clamp body and a turning assembly according to the present invention, an exploded view showing a member-to-be-held and a rotation assembly according to the present invention, an exploded view, similar to FIG. 3, but taken from a different perspective, a perspective view showing a clamping member of the preferred embodiment of the present invention, a schematic view illustrating a clamping operation of the preferred embodiment of the present invention, a schematic view illustrating a turning operation of the preferred embodiment of the present invention, another schematic view illustrating the turning operation of the preferred embodiment of the present invention, a schematic view illustrating a rotation operation of the preferred embodiment of the present invention, and another schematic view illustrating the rotation operation of the preferred embodiment of the present invention, these drawings clearly show that the clamp body 1 of the present invention is mainly formed of the first clamping member 11 and the second clamping member 12 mutually inserted into each other and rotatably coupled to each other to form an X-shape, wherein the two are each formed of a steel plate through stamping and bending. In the instant embodiment, the connection section 21 and the two clamping sections 22 are bent to form the first and second clamping members 11, 12 of which two ends (the first end section 151 and the second end section 152) are U-shapes that are opposite to each other so that a clamping operation conducted with the clamp body 1 provides four supporting points (the first clamping member 11 providing two clamping sections 22 and the second clamping member 12 providing two clamping sections 22) to therefore provide a more secured clamping effect, where the clamping cutout section 24 can be used to house a rectangular, circular, or elliptic tube or rod to prevent sliding frontward/rearward. Further, the end of each of the two clamping sections 22 that is distant from the clamping cutout section 24 is provided with at least one tenon section 23. In making the clamp body 1, the tenon sections 23 are simultaneously bent toward each other to joint and thus be fixed to each other. In the instant embodiment, the tenon sections 23 are made in the form of a dovetailed configuration so that during an operation of clamping, a force that acts on the clamping cutout section 24 is taken by the tenon sections 23 so as to further improve jointing strength between the two clamping sections 22. With such a unique arrangement of the clamp body 1, difficulty of manufacturing can be reduced and at the same time, secureness of clamping, strength of clamping, and durability can all improved.

To carry out an operation of clamping, the tightness adjustment assembly 13 is first released to allow the first clamping member 11 and the second clamping member 12 to rotate about a rotation center defined by the pivotal axle section 14 to adjust an opening width of the clamp body 1. Under this condition, since the threaded fastening member 131 is rotatably mounted, through the through aperture section 133 formed in the flattened section 132, to the position-constraining axle 121, the threaded fastening member 131 is allowed to swing or oscillate within the elongate through hole 123 of the first clamping member 11. The flattened section 132 is formed by applying a powerful external force to press and compress an end portion of the threaded fastening member 131, and then the through aperture section 133 is made through drilling conducted in the flattened section 132 to thereby form the unique configuration of the tightness adjustment assembly 13. Afterwards, screwing and setting the tightening member 134 would achieve easy adjustment the tightness and clamping force of the clamp body 1. Therefore, material selection and manufacturing of the tightness adjustment assembly 13 are also easy and simple and this, in combination with the arrangement of the tenon section 23, would allow for securely fixing through forcibly pressing or fastening by a user without the need for an external tool, nor concern about damaging the clamp body 1.

Figure 7:
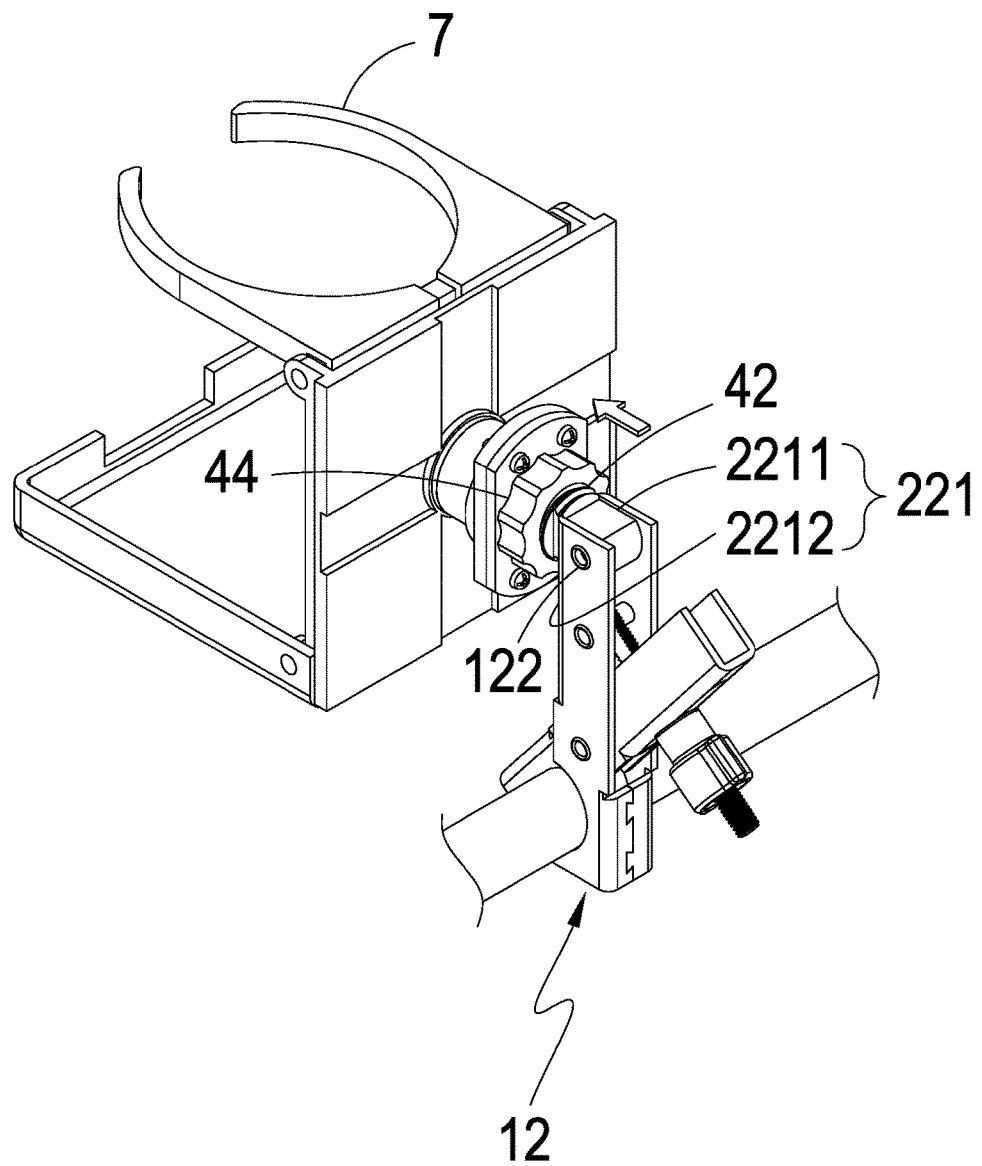
FIG. 7 is a schematic view illustrating a turning operation of the preferred embodiment of the present invention.
Figure 8:
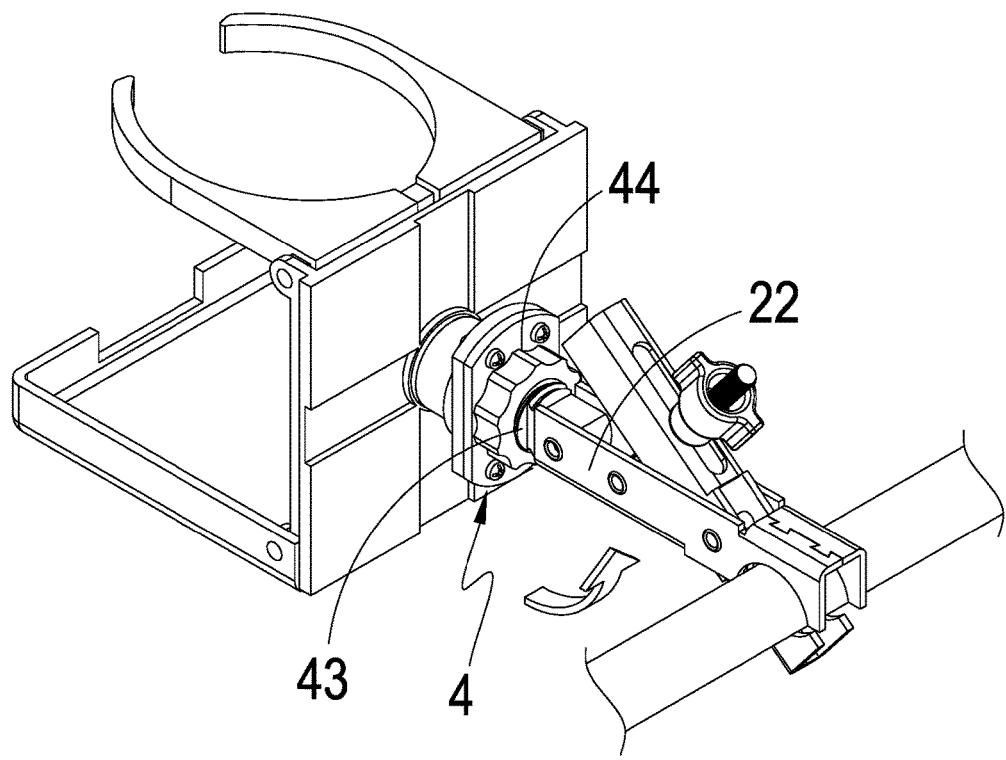
FIG. 8 is another schematic view illustrating the turning operation of the preferred embodiment of the present invention.
Figure 9:
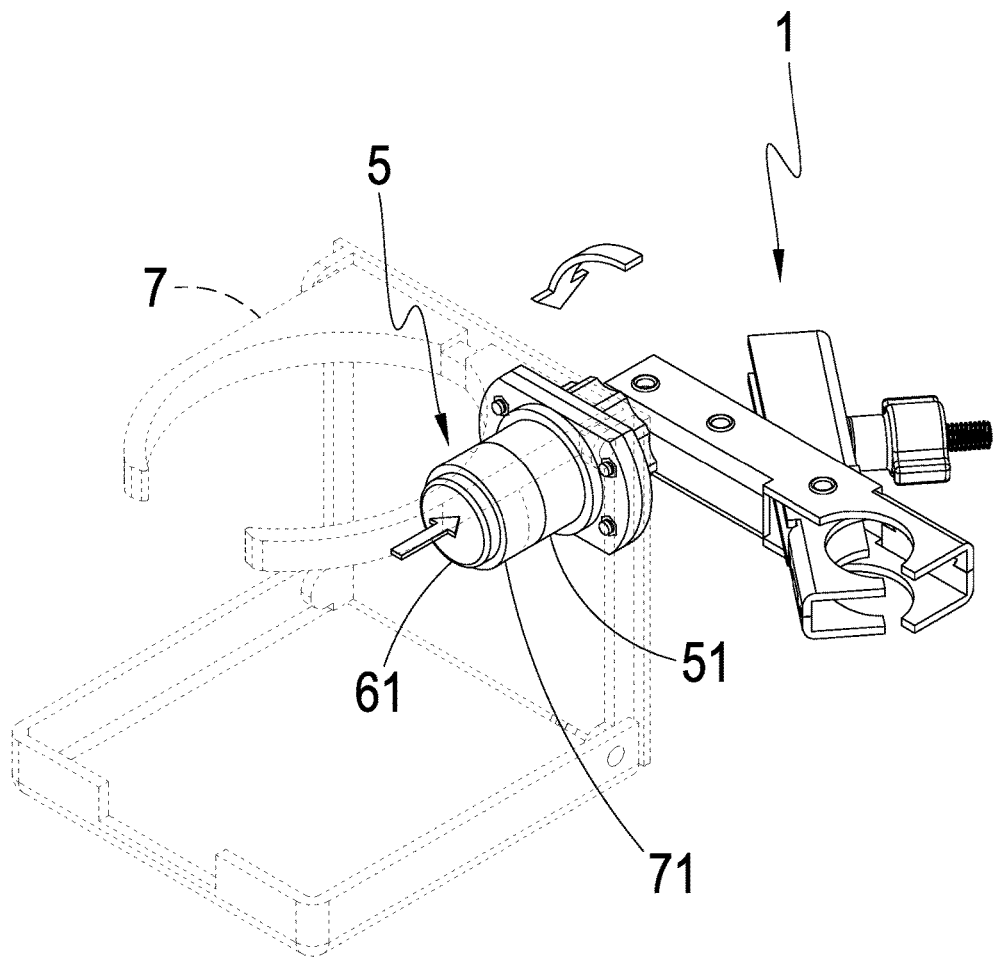
FIG. 9 is a schematic view illustrating a rotation operation of the preferred embodiment of the present invention.
Figure 10:
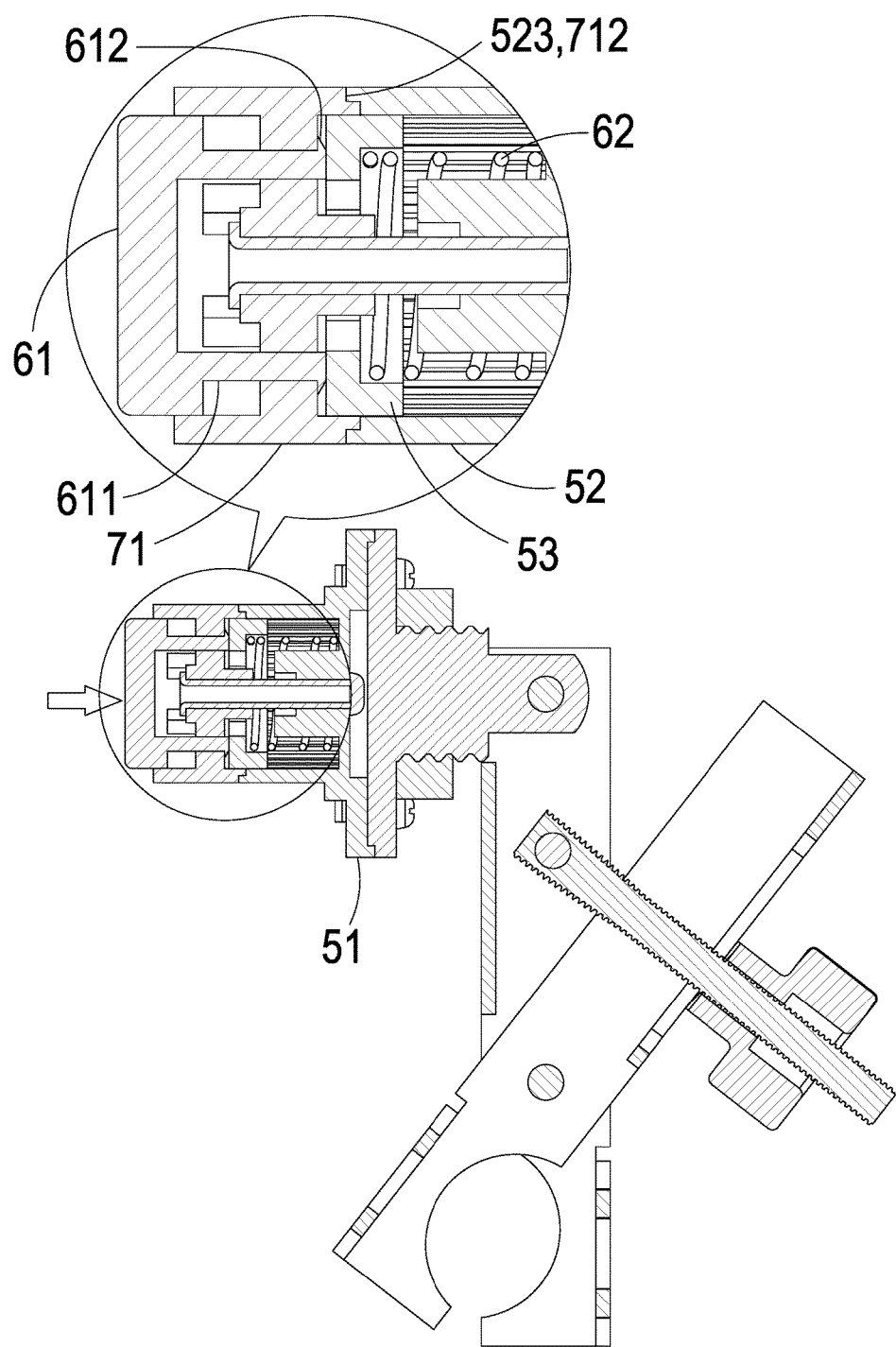
FIG. 10 is another schematic view illustrating the rotation operation of the preferred embodiment of the present invention.
Figure 11:
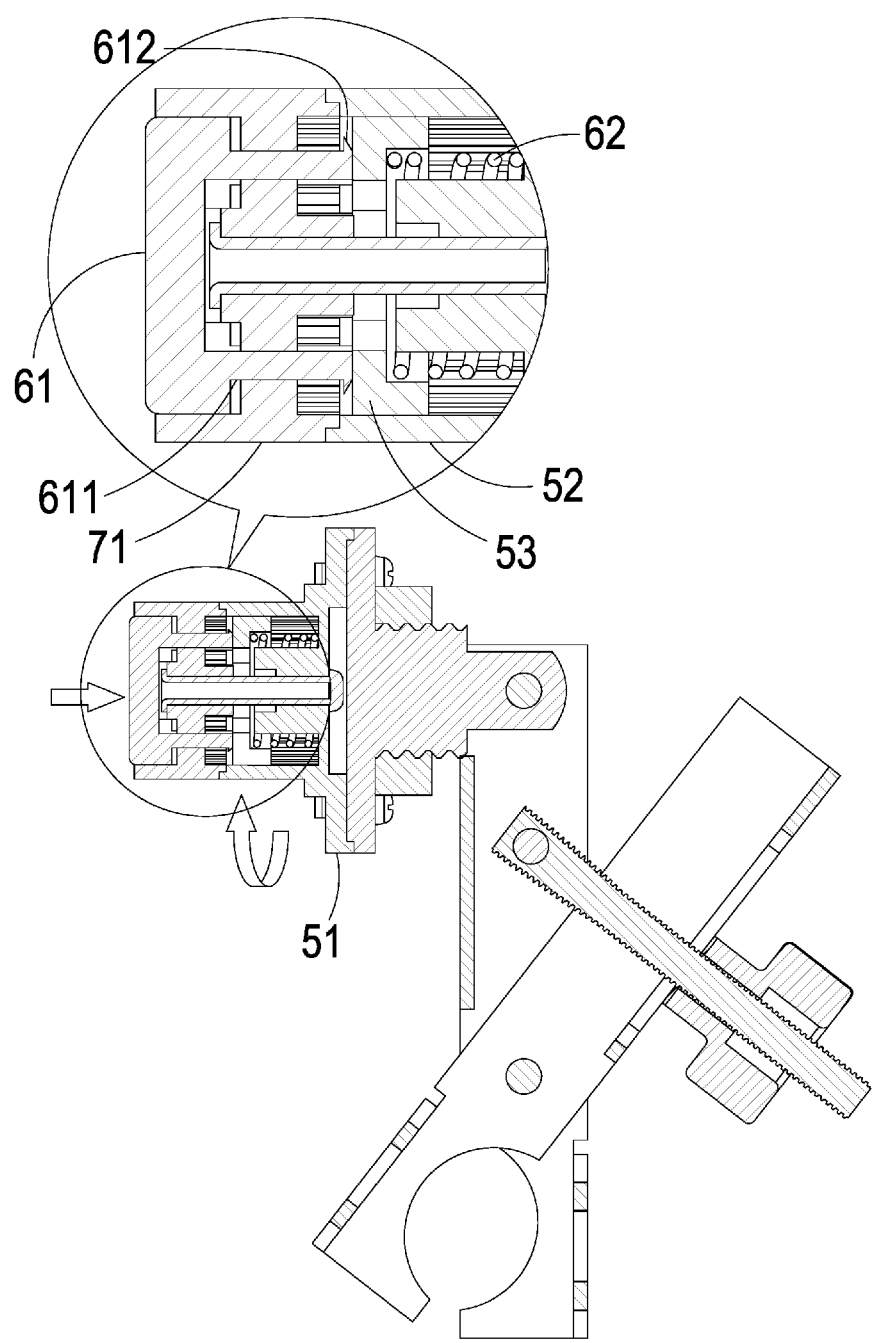
FIG. 11 is a further schematic view illustrating the rotation operation of the preferred embodiment of the present invention.

As to the turning assembly 4 and the rotation assembly 5 that are arranged at an end of the clamp body 1, they allow the user the freely change the member-to-be-held 7 for different types thereof, such as a cup holder (which is taken as an example of the member-to-be-held 7in this embodiment to), a working light, a rearview mirror, a phone holder, or a tablet computer holder. Such a structure is movably set in the turning opening section 124 by means of the turning seat 41 of the turning assembly 4 being rotatably mounted to the turning axle 122. (In case that no such a turning opening section 124 is provided, then the turning seat 41 can be coupled to the turning axle 122 or set to one side of the turning seat 12.) To turn, the positioning member 44 is released to allow the turning assembly 4 and the second clamping member 12 to turn, through rotation, with respect to each other. When the clamping sections 22 of the second clamping member 12 are rotated, the arrangement of the cut and removed sections 43 makes it possible to avoid the threaded fastening section 42 to be rotated to one side of the threaded fastening section 42 so that when a user selects a desired turned surface, the positioning member 44 is rotated oppositely to have the positioning member 44 abut one of the abutting surfaces 221 of the clamping sections 22 to thereby easily achieve an operation of turning and then fixing. (As shown in FIG. 7, abutting is made on the first abutting surfaces 2211 and the second abutting surfaces 2212 respectively before and after turning.)

The rotation operation of the rotation assembly 5 is achieved through mating arrangement between the engagement slot 52 of the rotation seat 51 and the engagement seat 71 of the member-to-be-held 7 (wherein the engagement seat 71 penetrates through the fixing wall 73 of the member-to-be-held 7 and is integrally formed with the member-to-be-held 7 at a suitable location) so that the engagement member 53 movably arranged in the engagement slot 52 is operatively coupled to and movable in unison with the rotation seat 51 and the engagement seat 71 so as to achieve free rotation in a range of 360 degrees. The position-constraining post 521 arranged in the engagement slot 52, in addition to receiving the elastic element 62 to simply fit thereto, also allows the position-constraining projection 522 of the position-constraining post 521 to correspondingly couple to the position-constraining recess 531 of the engagement member 53, serving as a retaining sliding rail for the elastic element 62 and the engagement member 53, so that the elastic element 62 and the engagement member 53 do not derail due to being pushed and pressed by the push member 61 and rotation sensitivity of the engagement seat 71 will not be deteriorated or even get jammed (wherein in the instant embodiment, the position-constraining projection 522 is made in a cruciform shape as an example for illustration) to thereby achieve an effect of assisting rotation and preventing the engagement seat 71 and the engagement member 53 from over wearing and excessive abrasion. In addition, the coupling of the rotation assembly 5 and the member-to-be-held 7 is such that the riveting element 54 extends through the first pin hole section 511 of the rotation seat 51, passing through the elastic element 62, the engagement member 53 and the second pin hole section 713 of the engagement seat 71 to allow an end of the riveting element 54 to be expanded and fixed to the member-to-be-held 7 by using a riveting machine.

Particularly, the present invention is made for further using the position-constraining mechanism 6 to make selective direction setting for the member-to-be-held 7, and the operation is easy and simple. The user only needs to press down the push member 61 to conduct relative rotation between the rotation seat 51 and the member-to-be-held 7. Corresponding operations of interior structural arrangements are described as follows. Pressing down the push member 61 causes the retaining section 611 to penetrate out of the engagement seat 71 through the position-constraining hole 711 so as to push against the engagement member 53 and the elastic element 62, allowing the engagement member 53 to temporarily separate from the engagement seat 71 and get accommodated in the engagement slot 52. Under this condition, the member-to-be-held 7 may be operated to drive the engagement seat 71 to take a relative rotation with respect to the rotation seat 51. During the rotation, achieved between the upper edge of the engagement slot 52 and the lower edge of the engagement seat 71 is coupling and mating between the first joint lip 523 and the second joint lip 712 to provide an effect of position constraining, making the engagement slot 52 of the rotation seat 51 and the engagement seat 71 more stably secured. When the user releases the push member 61, the engagement member 53 is pushed by the spring force of the elastic element 62 so that the engagement member 53 is driven and returns in an opposite direction to allow the engagement member 53 to re-engage between the engagement slot 52 and the engagement seat 71. Position returning of the engagement member 53 also pushes the push member 61 in the opposite direction so that the push member 61 ejects out. However, due to the barb section 612 provided on the retaining section 611, the barb section 612 may get engaging with a bottom of the engagement seat 71 to constrain the push member 61, in position, at one side of the engagement seat 71.

Figure 12:
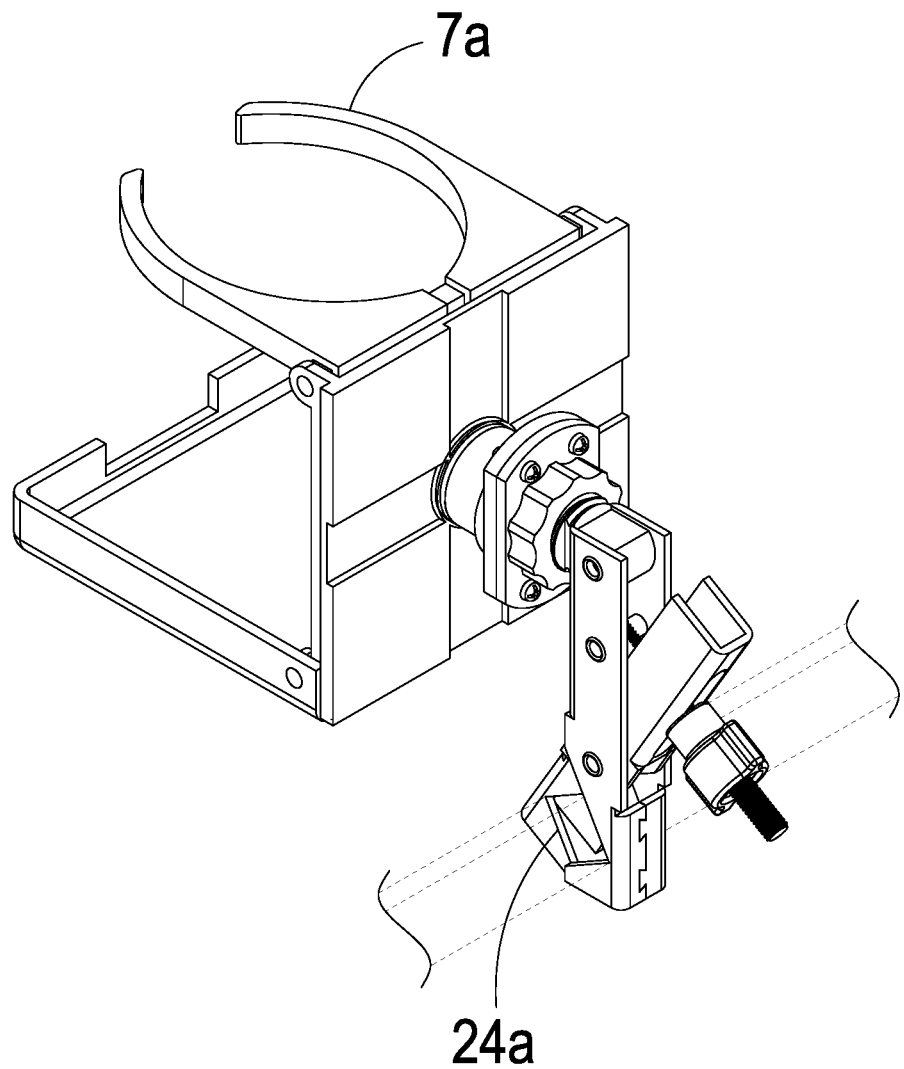
FIG. 12 is a perspective view showing a condition of use of another preferred embodiment of the present invention.

Further referring to FIG. 12, which is a perspective view showing a condition of use of another preferred embodiment of the present invention, it can be clearly seen from the drawing, the instant embodiment is generally similar to the previous embodiment and the only modification made in this embodiment is that the shape of the clamping cutout section 24a is changed from a semicircular shape for use in clamping a round tube to a triangular shape for clamping a square tube. Further, it is noted that the shape of the clamping cutout section 24a and the shape of the tube used in combination therewith are provided as examples of illustration of the present invention, and the present invention is not limited thereto. It is certain that the selection and exchange of the member-to-be-held 7a is made according to the need of the user, and thus, the present invention can be applied for an even wider range.

Figure 13:
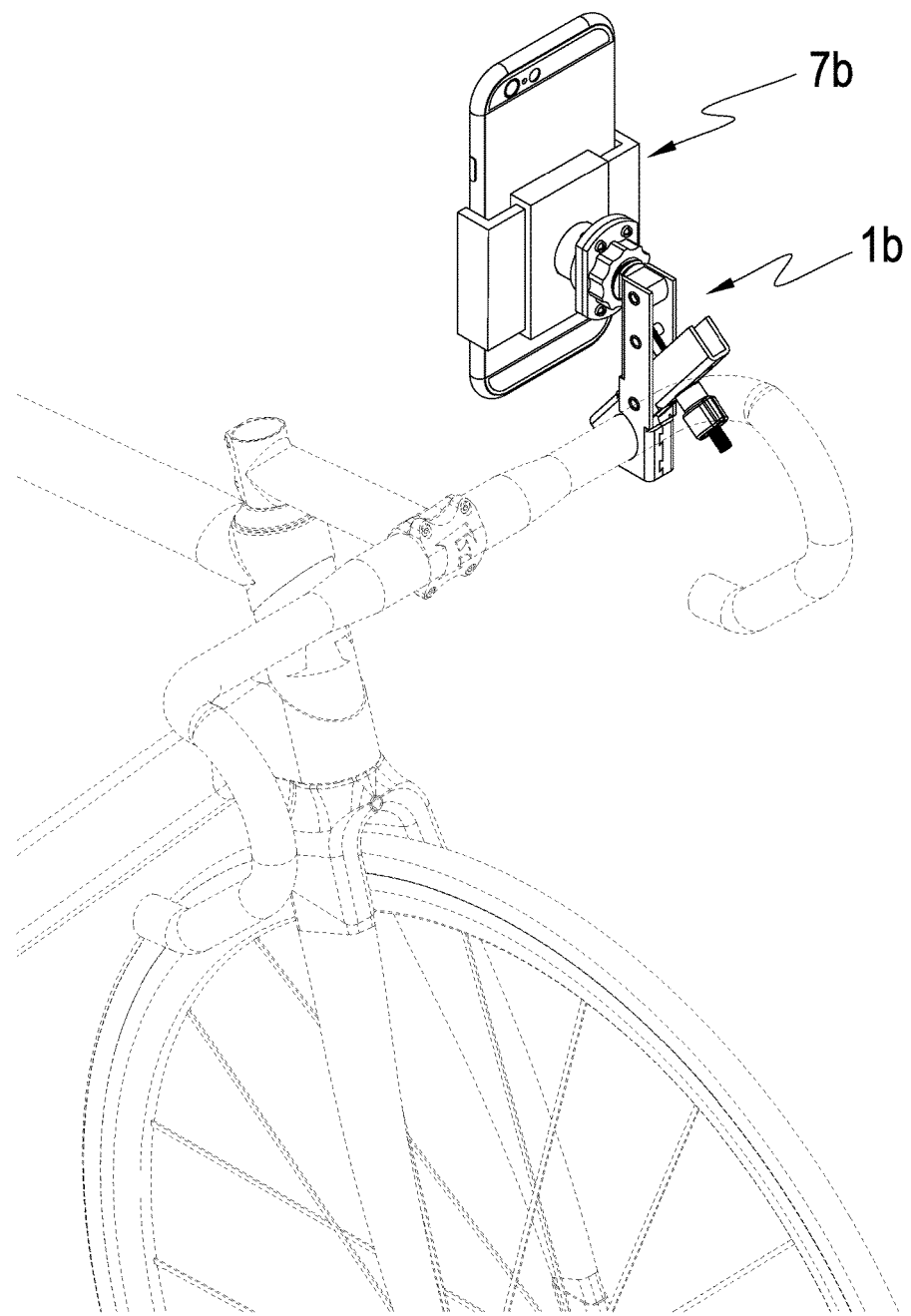
FIG. 13 is a perspective view showing a condition of use of a further preferred embodiment of the present invention.

Further referring to FIG. 13, which is a perspective view showing a condition of use of a further preferred embodiment of the present invention, it can be clearly seen from the drawing that the instant embodiment is generally similar to the previous embodiments and the only modification made in this embodiment is that the member-to-be-held 7b is made in the form of a mobile phone holder and the clamp body 1b is clamped to a bicycle as illustrative demonstration.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multidirectional fast tube-attachable frame, comprising:
   a clamp body, which is in the form of an X-shape, wherein the clamp body comprises a first clamping member and a second clamping member that are mutually inserted into each other and rotatably coupled to each other;
   a connection section that is respectively defined on the first clamping member and the second clamping member;
   an elongate through hole that is formed on the connection section of the first clamping member;
   two clamping sections that are respectively formed on and extending along opposite sides of the connection section;
   a plurality of abutting surfaces that are defined in side surfaces of the clamping sections;
   at least one tenon section that is respectively formed on the clamping sections for jointing to each other to strengthen a structural strength;
   a first end section that is defined at an end of the first clamping member and the second clamping member that is adjacent to the tenon section and is formed as an inverted U-shape;
   a second end section that is defined an end of the first clamping member and the second clamping member that is distant from the first end section and is formed as a U-shape such that the two ends of the first and second clamping members are set in a form U-shapes that are opposite to each other;
   a clamping cutout section that is respectively formed on an end of each of the clamping sections that is distant from the tenon section, where the clamping cutout section has a contour that is one of a rectangle, a circle, and an ellipse;
   a position-constraining axle that is arranged between the second clamping member and the clamping sections;
   a pivotal axle section that is arranged between the first clamping member and the second clamping member, wherein the pivotal axle section is located between the clamping cutout section and the position-constraining axle of the second clamping member and corresponds, in position, to the first clamping member;
   a turning axle that is arranged at one side of the position-constraining axle and is located between the clamping sections;
   a tightness adjustment assembly that is movably arranged at one side of the first clamping member and is operable to adjust tightness of the first clamping member and the second clamping member, wherein the tightness adjustment assembly comprises a threaded fastening member penetrating through the elongate through hole, a flattened section formed on the threaded fastening member, a through aperture section formed on the flattened section to receive the position-constraining axle to penetrate therethrough, and a tightening member screwed on the threaded fastening member for fastening the first clamping member;
   a turning assembly that is movably arranged on the second clamping member to couple with a member-to-be-held, wherein the turning assembly comprises a turning seat rotatably mounted to the turning axle, a threaded fastening section formed on the turning seat, a plurality of cut and removed sections respectively formed on opposite sides of the turning seat and located on the threaded fastening section, and a positioning member fit to the turning seat and screwed on the threaded fastening section, such that the positioning member is selectively abutting one of the abutting surfaces;
   a rotation assembly arranged at one side of the turning assembly, wherein the rotation assembly comprises a rotation seat coupled to the turning assembly, an engagement slot formed on the rotation seat, at least one first joint lip defined on an upper edge of the engagement slot, and an engagement member movably arranged in the engagement slot;
   at least one second joint lip, which is defined on a lower edge of an engagement seat to couple with the first joint lip; and
   a position-constraining mechanism that is arranged at one side of the engagement seat to selectively change, through the rotation assembly, a direction of the member-to-be-held, wherein the position-constraining mechanism comprises a push member that is mounted to the member-to-be-held in a manner of being operable to selectively project out thereof to selectively push and move the engagement member, and an elastic element arranged in the engagement slot to allow for reciprocal movement of the engagement member.

2. The multidirectional fast tube-attachable frame according to claim 1, wherein the engagement seat is formed with at least one position-constraining hole and the push member comprises at least one retaining section penetrating through the position-constraining hole and a barb section formed on the retaining section for engaging the engagement seat.

3. The multidirectional fast tube-attachable frame according to claim 1, wherein the engagement slot is formed, in an interior thereof, with a position-constraining post over which the elastic element is fit and the position-constraining post is formed, on a side wall thereof, with at least one position-constraining projection; and the engagement member is formed with a position-constraining recess corresponding to and coupled to the position-constraining projection of the position-constraining post.

4. The multidirectional fast tube-attachable frame according to claim 3, wherein the rotation assembly comprises a riveting element that penetrates through the position-constraining post and the engagement member for rivet-jointing the rotation seat and the engagement seat.

5. The multidirectional fast tube-attachable frame according to claim 4, wherein the rotation seat is formed, in a center thereof, with a first pin hole section and the engagement seat is formed, in a center thereof, with a second pin hole section that corresponds, in position, to the first pin hole section so as to allow the riveting element to penetrate through the first pin hole section and the second pin hole section.

6. The multidirectional fast tube-attachable frame according to claim 1, wherein the connection section of the second clamping member is formed, on an end thereof that is distant from the tenon section, with a turning opening section for turning of the turning assembly.

7. The multidirectional fast tube-attachable frame according to claim 1, wherein the member-to-be-held is formed with a fixing wall and the engagement seat is formed on the fixing wall.

* * * * *